United States Patent [19]

Hirose

[11] Patent Number: 5,259,494

[45] Date of Patent: Nov. 9, 1993

[54] PALLET EXCHANGING DEVICE FOR MACHINE TOOL

[75] Inventor: Noboru Hirose, Nagoya, Japan

[73] Assignee: Brother Kogyo Kabushiki Kaisha, Nagoya, Japan

[21] Appl. No.: 958,736

[22] Filed: Oct. 9, 1992

[30] Foreign Application Priority Data

Nov. 20, 1991 [JP] Japan .................. 3-305036

[51] Int. Cl.⁵ .............................................. B65G 37/00
[52] U.S. Cl. ........................... 198/345.3; 198/346.1; 29/33 P
[58] Field of Search ............... 198/346.1, 346.2, 465.1, 198/465.2, 465.3, 345.3; 29/33 P

[56] References Cited

U.S. PATENT DOCUMENTS

| | | | |
|---|---|---|---|
| 4,449,277 | 5/1984 | Hasegawa et al. | 29/33 P |
| 4,799,582 | 1/1989 | Itoh | 198/346.1 |
| 4,858,290 | 8/1989 | Hirose. | |
| 4,997,078 | 3/1991 | Itoh | 198/346.1 |
| 5,099,981 | 3/1992 | Guzzoni | 198/346.1 |
| 5,145,048 | 9/1992 | Kitamura | 198/346.1 |
| 5,203,445 | 4/1993 | Shiraiwa | 198/346.1 X |

FOREIGN PATENT DOCUMENTS

| | | | |
|---|---|---|---|
| 0157756 | 7/1987 | Japan | 198/346.1 |
| 0016942 | 1/1988 | Japan | 198/346.1 |
| 0093541 | 4/1988 | Japan | 198/346.1 |
| 1-35797 | 11/1989 | Japan. | |
| 3-136738 | 6/1991 | Japan. | |

Primary Examiner—D. Glenn Dayoan
Attorney, Agent, or Firm—Oliff & Berridge

[57] ABSTRACT

When machining of a workpiece mounted on a first pallet by a machine tool is ended, power of a driving motor is transmitted through a cylindrical cam and a cam follower to a clamp member to unclamp a first pallet clamped on a table of the machine tool by the clamp member. Then, the power is transmitted to a swing arm to unload the first pallet from the table to a stand-by position and a second pallet, mounting thereon a workpiece to be machined, is loaded from the stand-by position to the table by the swing arm. The second pallet is the clamped on the table by the clamp member and the pallet exchange operation is complete.

15 Claims, 9 Drawing Sheets

PALLET EXCHANGING DEVICE FOR MACHINE TOOL

BACKGROUND OF THE INVENTION

1. Field of the Invention

The invention relates to a pallet exchanging device for a machine tool.

2. Description of Related Art

A conventional pallet exchanging device for a machine tool, as described in Japanese Patent Laid-open No. Hei 3-136738 and Japanese Utility Model No. Hei 1-35797, has individual driving sources for a pallet clamp/unclamp mechanism and a pallet load/unload mechanism.

However, as the conventional pallet exchanging device has the individual driving sources, it suffers disadvantageous such as increased cost and a need for increased installation space. Further, in controlling an operation timing using the individual driving sources, there occurs a loss of time for the sequencing of operations to be carried out for the purpose of ensuring operation reliability, thus requiring increased time for the pallet exchanging operation.

SUMMARY OF THE INVENTION

It is accordingly an object of the invention to reduce costs, shorten the pallet exchanging time, and improve operation reliability by employing a single driving source for driving plural kinds of mechanisms.

According to the invention, there is provided in a machine tool having a table, a pallet exchanging device mounted on the table for exchanging a first pallet placed on the table for a second pallet placed in a stand-by position, the first pallet mounting thereon a machined workpiece, the second pallet mounting thereon a workpiece to be machined, the pallet exchanging device comprising a clamp/unclamp mechanism for clamping and unclamping one of the first pallet and the second pallet on the table; a load/unload mechanism for unloading the first pallet from the table to the stand-by position and loading the second pallet from the stand-by position to the table; a single driving source for driving the clamp/unclamp mechanism and the load/unload mechanism; and a power driving and transmitting mechanism for dividing power of the single driving source and transmitting the divided power to the clamp/unclamp mechanism and the load/unload mechanism at a predetermined timing.

With this structure, when machining of the workpiece mounted on the first pallet by the machine tool is ended, the power of the driving source is transmitted through the power dividing and transmitting mechanism to the clamp/unclamp mechanism to unclamp the first pallet clamped on the table of the machine tool by the clamp/unclamp mechanism. Then, the power is transmitted through the power dividing and transmitting mechanism to the load/unload mechanism to unload the first pallet from the table to the stand-by position. The second pallet, mounting thereon the workpiece to be machined, is then loaded from the stand-by position to the table by the load/unload mechanism. Lastly, the second pallet is clamped on the table by the clamp/unclamp mechanism and the pallet exchanging operation is completed.

As apparent from the above description, according to the invention, the clamping/unclamping operation and the loading/unloading operation as a primary operation in a pallet exchanging operation can be performed using a single driving source. It is unnecessary to provide sensors or the like for detecting operating conditions of the mechanisms to sequentially control the same during unclamping and unloading of the first pallet and during loading and clamping of the second pallet. That is, the pallet exchanging device of the invention can successively perform these operations thereby realizing a reduction in the size of the device, cost reduction, reduction in pallet exchanging time, and an improvement in operation reliability.

BRIEF DESCRIPTION OF THE DRAWINGS

A preferred embodiment of the invention will be described in detail with reference to the following figures, wherein.

DETAILED DESCRIPTION OF THE PREFERRED EMBODIMENTS

Figure 4:
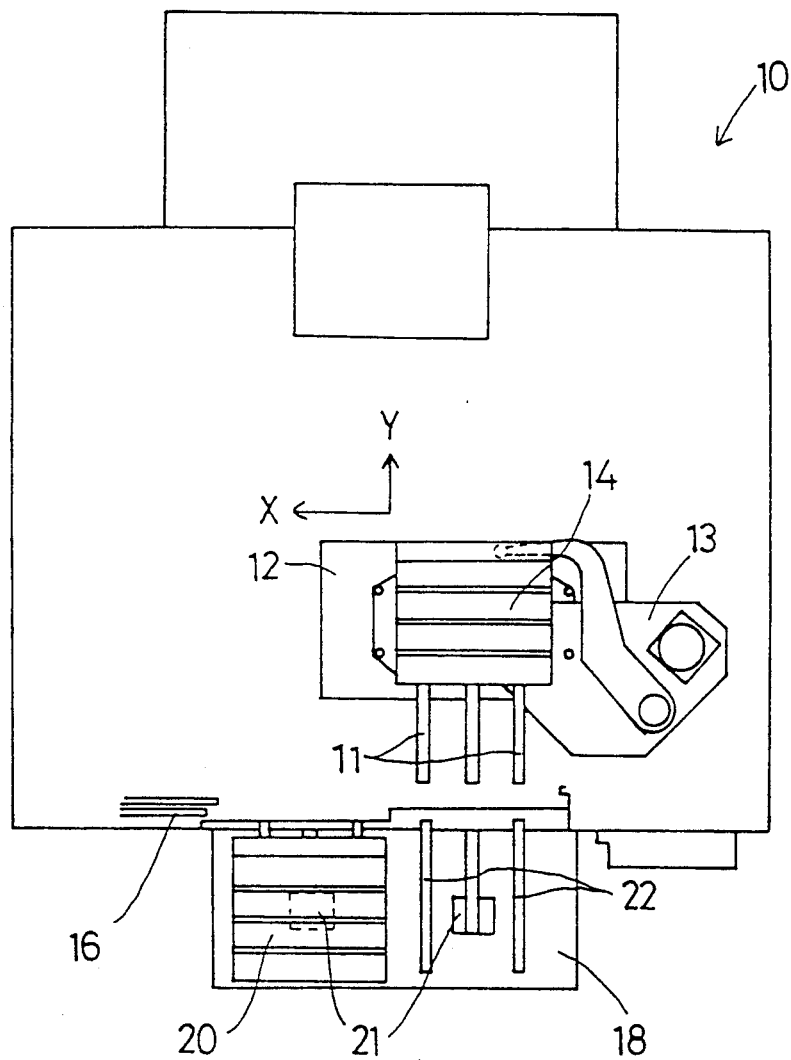
FIG. 4 is a plan view of a machine tool mounting therein the pallet exchanging device.
Figure 5:
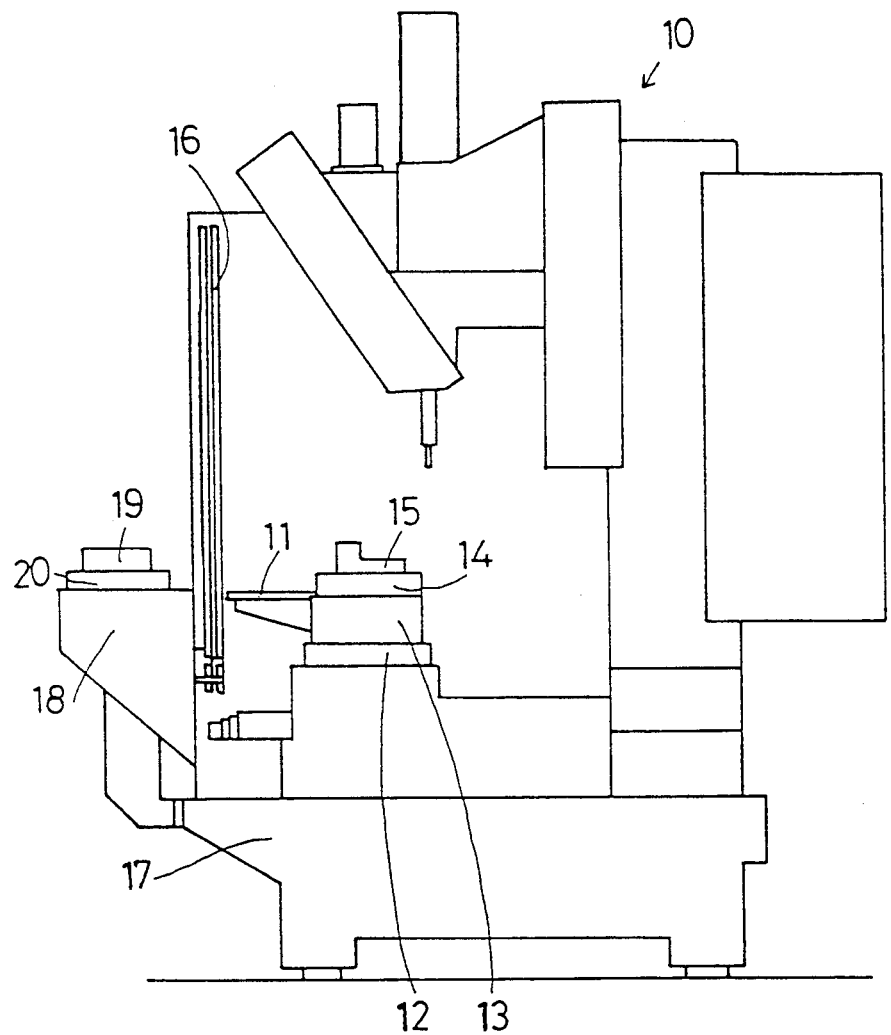
FIG. 5 is a right side view of FIG. 4.

Referring first to FIGS. 4 and 5, reference numeral 10 generally designates a machine tool. The machine tool 10 includes a table 12 movable in the X and Y directions as shown in FIG. 4.

A pallet exchanging device 13 is mounted on the table 12. As will be hereinafter described in detail, the pallet exchanging device 13 has a clamp/unclamp mechanism, a load/unload mechanism, and a power dividing and transmitting mechanism. By these mechanisms, a pallet 14 or 20 is adapted to be loaded onto the table 12 and clamped thereon and is further adapted to be unclamped and unloaded from the table 12. In FIGS. 4 and 5, there is shown a condition where the pallet 14 is loaded onto the table 12 and is then clamped thereon.

A plurality of parallel rails 11 for slidably supporting the pallet 14 or 20 are fixed to a front end of the table 12. A workpiece 15 is mounted on the pallet 14 and it is subjected to machining by the machine tool 10.

The machine tool 10 is provided at its front end with an automatic door 16 for closing an opening 16a allowing the passage, when open, of the pallet 14 or 20 therethrough upon loading or unloading. In FIG. 4, there is shown an open condition of the automatic door 16. A pallet rack 18 is fixedly mounted on a bed 17 of the machine tool 10 at a position just before the opening 16a, which position will be hereinafter referred to as a stand-by position. The pallet rack 18 has a space for placing both the pallets 14 and 20 in juxtaposed arrangement.

Figure 11:
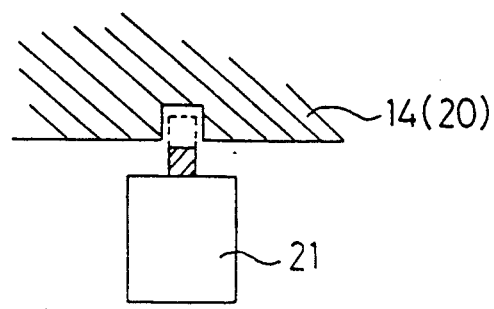
FIG. 11 shows a catch member for engaging and holding a pallet at a stand-by position.

A plurality of parallel rails 22 for slidably supporting the pallet 14 to be transferred from the rails 11 and slidably supporting the pallet 20 to be transferred to the rails 11 are fixed on the pallet rack 18. A workpiece 19, to be machined, is mounted on the pallet 20, and the pallet 20 is held in a fixed position on the rails 22 by a catch member 21 (FIG. 11) having a fixed holding force. When a force exceeding the fixed holding force is applied to the catch member 21 through an action to move pallet 20 (or pallet 14), the pallet 20 is allowed to be moved in the Y direction shown in FIG. 4.

Figure 1:
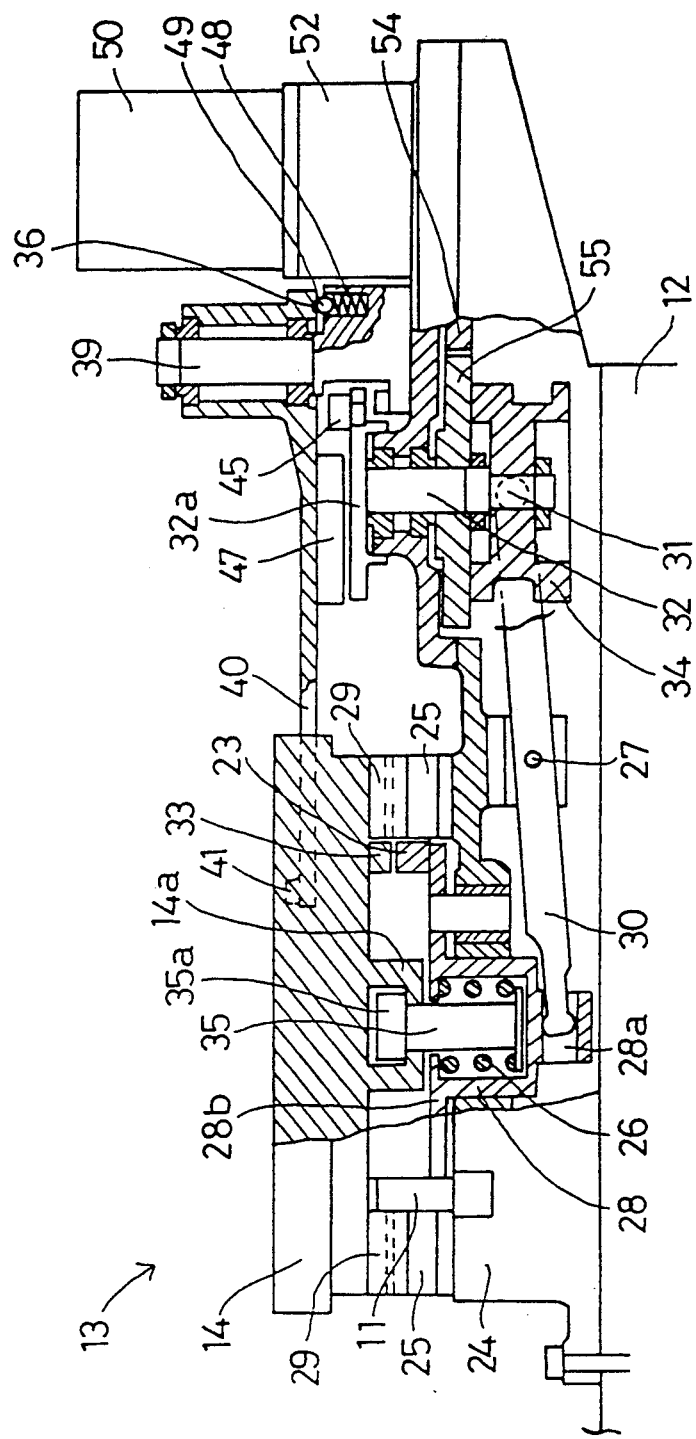
FIG. 1 is a partially sectional elevational view of a pallet exchanging device according to the invention.
Figure 2:
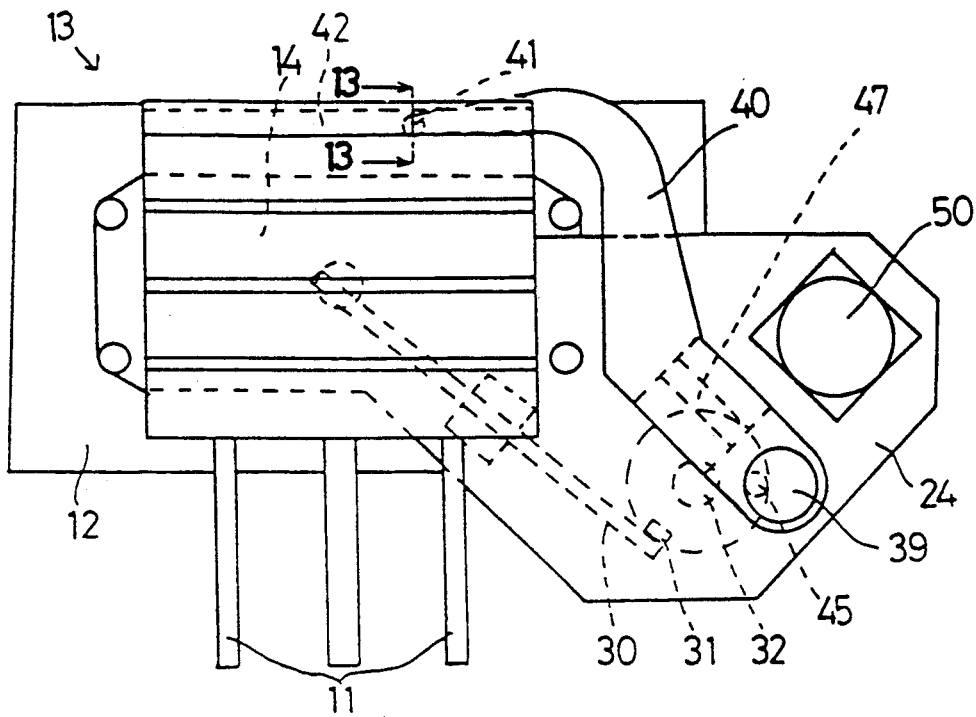
FIG. 2 is a plan view of FIG. 1.
Figure 3:
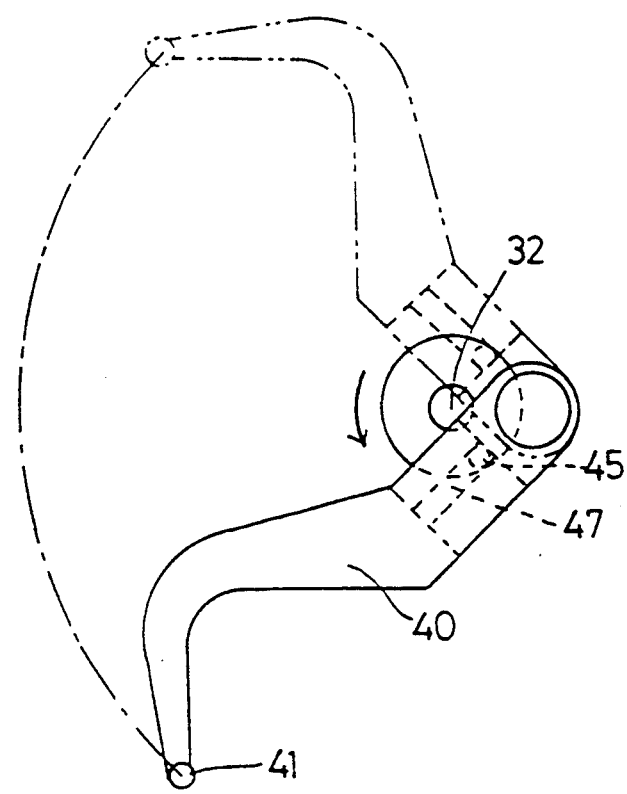
FIG. 3 is a plan view of a swing arm, showing the operation thereof.

Referring to FIGS. 1 to 3, a base 24 of the pallet exchanging device 13 is fixedly mounted on the table 12. Four positioning members 25 are provided on an upper surface of the base 24, and four positioned members 29 are provided on a lower surface of the pallet 14 so as to respectively face the four positioning members 25 of the base 24. A clamp member 28 having an upper plate portion 28b is vertically movably engaged with the base 24. A coil spring 26 is incorporated in the clamp member 28. The pallet 14 is positioned through the positioned members 29 and the positioning members 25 to the base 24 so as to be clamped or unclamped by the vertical movement of the clamp member 28 engaging or disengaging from a groove extension 14a on the lower surface of pallet 14.

Two parallel rails 23 are fixed on the upper plate portion 28b of the clamp member 28 at opposite ends thereof so as to be vertically moved together with the clamp member 28. On the other hand, two slide members 33 are mounted on the lower surface of the pallet 14 so as to respectively face the rails 23 and slide thereon. A clamp pin 35 is vertically movably retained in the clamp member 28 so as to be normally biased downward by the coil spring 26. The clamp pin 35 is formed at its upper end with an engaging portion 35a adapted to engage an engaging portion 14a formed on the lower surface of the pallet 14.

Figure 12:
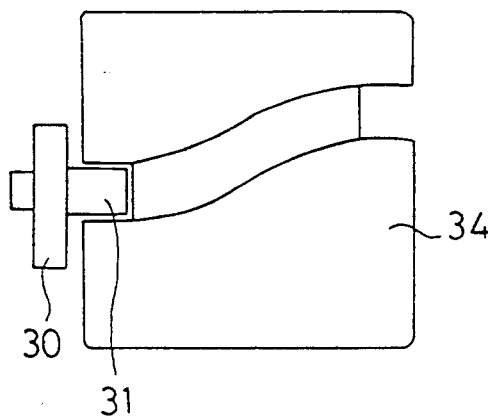
FIG. 12 is a side view of a cam follower and a cylindrical cam that are part of a pallet clamping apparatus.

The clamp member 28 is formed at its lower end with an engaging portion 28a. A seesaw arm 30 is vertically swingably supported at its intermediate portion to a pivot 27 fixed to the base 24. One end of the seesaw arm 30 is vertically movably engaged with the engaging portion 28a of the clamp member 28. A cam follower 31 is provided at the other end of the seesaw arm 30. A power dividing shaft 32 is rotatably supported to the base 24. A cylindrical cam 34 is mounted on the power dividing shaft 32. The cylindrical cam 34 is engaged with the cam follower 31 of the seesaw arm 30 (FIG. 12). Accordingly, rotatory motion of the cylindrical cam 34 is converted into vertical swing motion of the seesaw arm 30.

Figure 13:
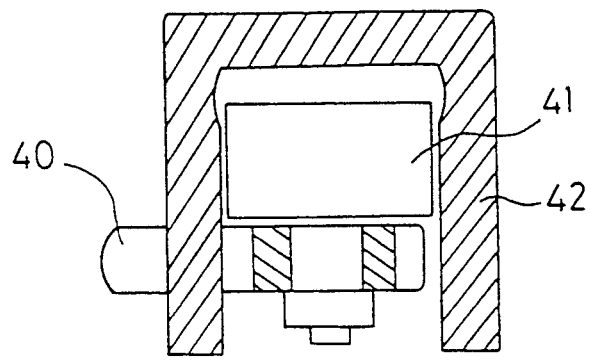
FIG. 13 shows a cross-sectional view, along line 13—13 of FIG. 2, of the relationship between a cam follower and a follower guide used for moving the pallet.

A swing arm 40 is horizontally swingably supported at its base end to a pivot 39 fixed to the base 24. A cam follower 41 is provided at a free end of the swing arm 40. On the other hand, the pallet 14 is formed at its rear end portion (an upper end portion as viewed in FIG. 2) with a follower guide 42 adapted to engage the cam follower 41 of the swing arm 40 (FIG. 13). Accordingly, horizontal swing motion of the swing arm 40 is converted into linear motion of the pallet 14 in the Y direction shown in FIG. 4.

The pallet 20 is also provided at its rear end portion with a follower guide 43 (see FIG. 8) similar to the follower guide 42 of the pallet 14. When the pallet 14 is unloaded from the table 12 to the stand-by position to come into juxtaposition to the pallet 20 having waited in the stand-by position, the follower guide 42 of the pallet 14 is aligned with the follower guide 43 of the pallet 20 so that the cam follower 41 of the swing arm 40 may be linearly transferred from the follower guide 42 to the follower guide 43 as table 12 moves in the X direction shown in FIG. 4.

The power dividing shaft 32 has an upper disk portion 32a, and a cam follower 45 is mounted on an upper surface of the upper disk portion 32a at a peripheral position thereof. On the other hand, a follower guide 47 is mounted on a lower surface of the swing arm 40 in the vicinity of the pivot 39. The cam follower 45 of the power dividing shaft 32 is adapted to engage the follower guide 47 of the swing arm 40. Accordingly, rotatory motion of the cam follower 45 together with the power dividing shaft 32 is converted into horizontal swing motion of the swing arm 40 between a position shown by a solid line and a position indicated by a two-dot chain line in FIG. 3. Two indents 36 are formed on the lower surface of the swing arm 40 at the base end thereof. A steel ball 49, normally biased upward by a coil spring 48, is provided in the pivot 39 so as to engage one of the two indents 36 of the swing arm 40. Accordingly, at each swing end of the swing arm 40, the swing arm 40 is held in position by the engagement of one of the indents 36 with the steel ball 49. A driving motor 50 is mounted on the base 24 and power of the driving motor 50 is transmitted through a speed reducer 52, gears 54 and 55 to the power dividing shaft 32.

The operation of the pallet exchanging device having the above described structure will be described with reference to FIGS. 6 to 10.

Figure 6:
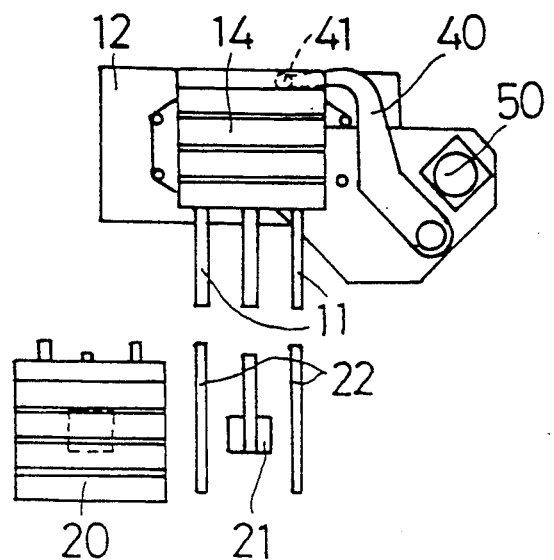
FIGS. 6 to 9 are schematic plan views illustrating a pallet exchanging operation.

FIG. 6 shows the condition where machining of the workpiece 15 on the pallet 14 by the machine tool 10 has ended, the table 12 having the pallet 14 thereon is moved to an unload position for the pallet 14, and the automatic door 16 of the machine tool 10 is opened to wait for an unloading operation of the pallet 14. When the driving motor 50 is rotated in a forward direction thereof from this condition, the power of the driving motor 50 is transmitted through the speed reducer 52 and the gears 54 and 55 to the power dividing shaft 32, thereby rotating the power dividing shaft 32 in a counterclockwise direction as viewed in FIG. 6.

Figure 10:
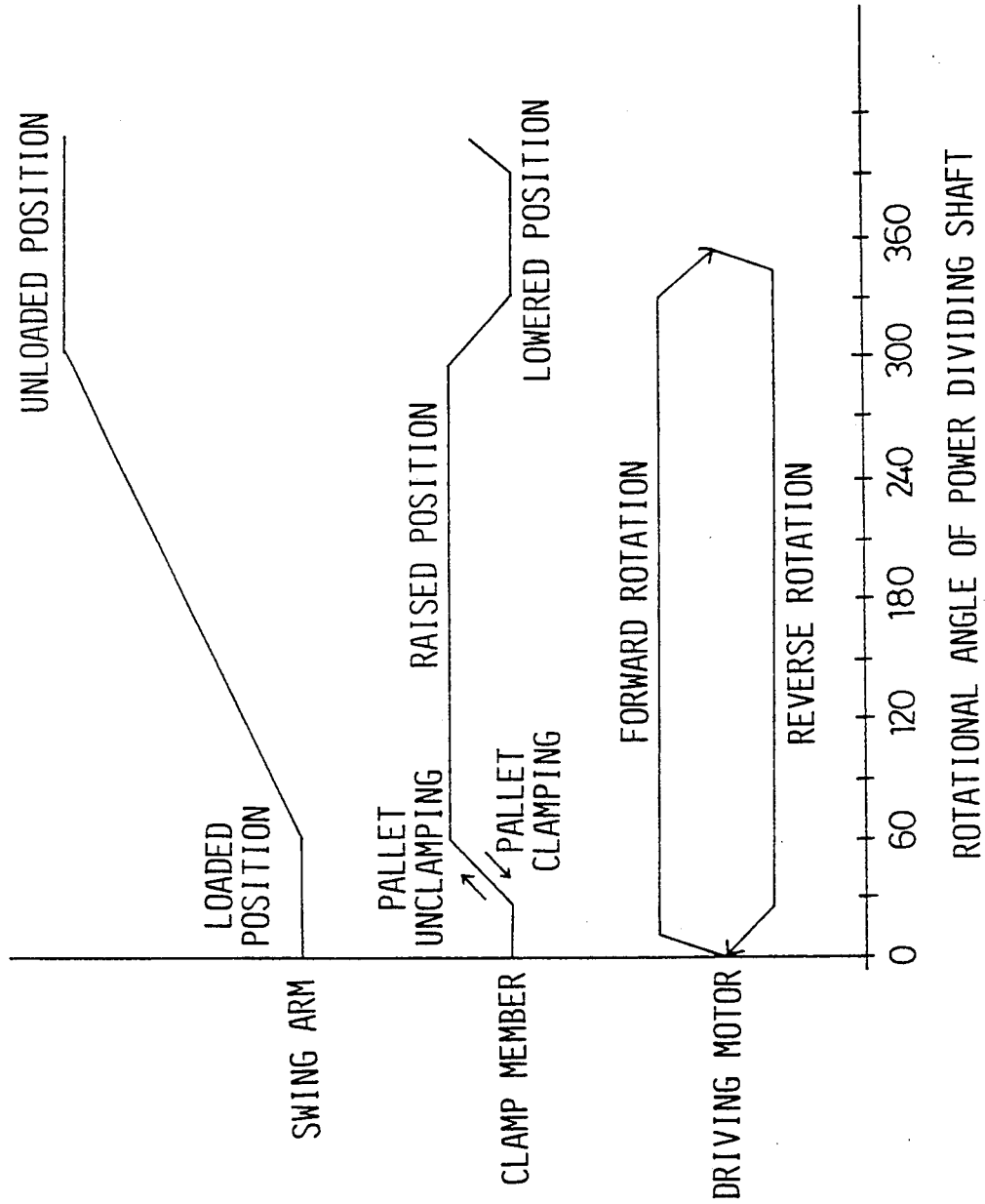
FIG. 10 is a timing chart of the operation of the pallet exchanging device.

As shown in FIG. 10, when a rotational angle of the power dividing shaft 32 becomes 30 degrees, the clamp member 28 starts to be raised by the cylindrical cam 34 through the seesaw arm 30.

During the rising operation of the clamp member 28, the coil spring 26 applying clamping force to the pallet 14 relaxes (that is, the tension is removed as it can fully compress) and after the relaxation amount of the coil spring 26 reaches a predetermined value (corresponding to full compression, that is, it is tension free), the engaging portion 35a of the clamp pin 35 disengages from the engaging portion 14a of the pallet 14 and the upper surfaces of the rails 23 are brought into contact with the lower surfaces of the slide members 33. The pallet 14 is then slightly raised by the clamp member 28.

When the rotational angle of the power dividing shaft 32 becomes 60 degrees, the raising operation of the clamp member 28 ends. By the raising operation of the clamp member 28, the positioned members 29 of the pallet 14 disengage from the positioning members 25 of the base 24 to release the pallet 14 and the level of the upper surfaces of the rails 23 become the same as the level of the upper surfaces of the rails 11. At the same time the pallet 14 is released, the cam follower 45 of the power dividing shaft 32 engages the follower guide 47 of the swing arm 40 and the swing arm 40, having been held in position by the steel ball 49 and the coil spring 48, starts to swing. As a result, the pallet 14 starts to be moved to the stand-by position by the engagement of the cam follower 41 of the swing arm 40 with the follower guide 42 of the pallet 14.

Figure 7:
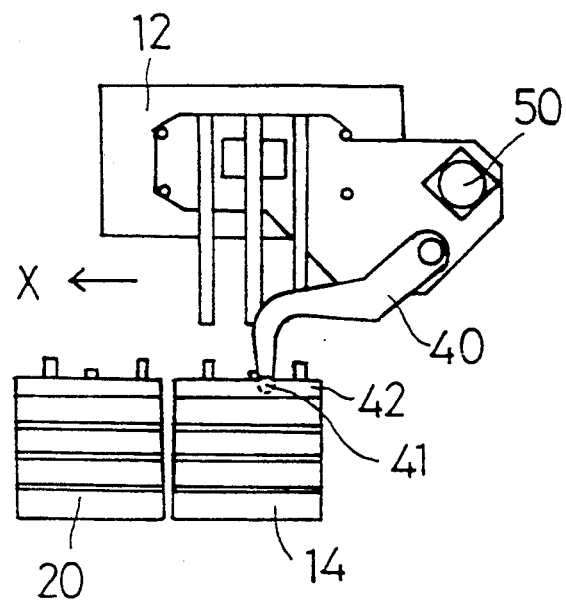

During the movement of the pallet 14 to the stand-by position, the pallet 14 is first shifted from the rails 23 to the rails 11 and then shifted from the rails 11 to the rails 22. When the rotational angle of the power dividing shaft 32 becomes 300 degrees, the unloading operation of the pallet 14 is completed as shown in FIG. 7. At this time, the swing arm 40 is again held in position by the steel ball 49 and the coil spring 48. Thereafter, only the clamp member 28 is lowered by the cylindrical cam 34 through the seesaw arm 30, and the driving motor 50 is then stopped.

The thus unloaded pallet 14 is held in the stand-by position by the catch member 21 in a notched fashion after the unloading operation. In this condition, the follower guide 42 of the pallet 14 is aligned with the follower guide 43 of the pallet 20 having waited in the stand-by position.

Figure 8:
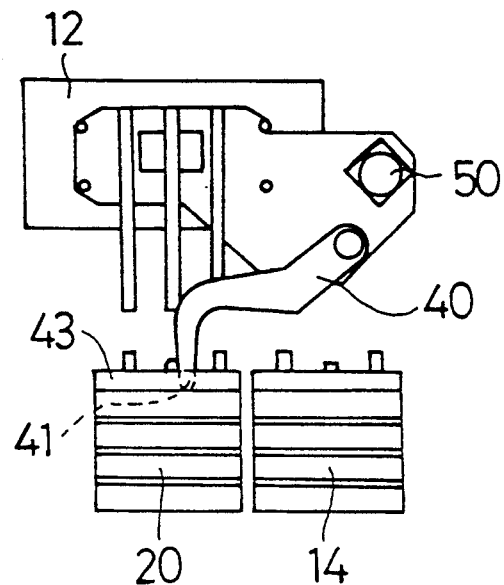
Figure 9:
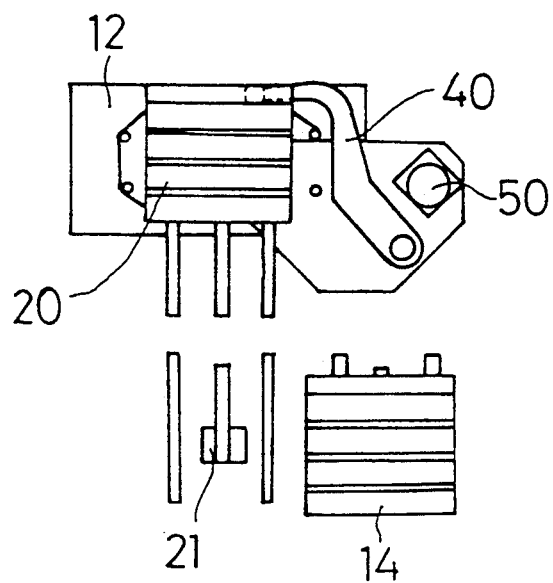

Next, the table 12 of the machine tool 10 is moved in the X direction shown in FIG. 7, disengaging the cam follower 41 of the swing arm 40 from the follower guide 42 of the pallet 14 and then engaging the cam follower 41 with the follower guide 43 of the pallet 20 as shown in FIG. 8. That is, FIG. 8 shows a condition where the table 12 of the machine tool 10 is moved in the X direction to move to the loadable position for the pallet 20. In this position, the driving motor 50 is started again to rotate in a reverse direction in order to release the pallet 20 from the catch member 21 and load the pallet 20 on the table 12. Then, the pallet 20 is clamped by the coil spring 26 in the clamp member 28 in the position shown in FIG. 9. As the loading operation of the pallet 20 is reverse to the unloading operation of the pallet 14, a detailed explanation is omitted.

As described above, according to the invention, the clamping/unclamping operation and the loading/unloading operation of the pallet as a primary operation in the pallet exchanging operation can be performed successively by the single driving motor 50 and the two kinds of cam mechanisms. Further, the coil spring 26, for clamping the pallet, is incorporated in the clamp member 28. Accordingly, the mechanism of the pallet exchanging device is simplified and the capacity of the driving motor 50 can be reduced. Thus, the invention can realize various advantages such as a reduction in the size of the device, cost reduction, reduction in exchanging time, and an improvement in operation reliability.

The reduction in size of the device can be applied to various types of machine tools. As in the above preferred embodiment, the device can be mounted on a table moving type of machine tool.

Further, it is to be understood that the application of the invention is not limited to the table moving type of machine tool, but the present invention may be applied to a column moving type of machine tool with the table fixed.

What is claimed is:

1. A pallet exchanging device for a machine tool having a table, the pallet exchanging device mounted on the table for exchanging a first pallet placed on said table for a second pallet placed in a stand-by position, the first pallet mounting thereon a machined workpiece, the second pallet mounting thereon a workpiece to be machined, the pallet exchanging device comprising:
    clamp/unclamp means for clamping and unclamping one of said first pallet and said second pallet on said table;
    load/unload means for unloading said first pallet from said table to the stand-by position and loading said second pallet from the stand-by position to said table;
    a single driving source for driving said clamp/unclamp means and said load/unload means; and
    power dividing and transmitting means for dividing power of said single driving source and transmitting the power divided to said clamp/unclamp means and said load/unload means at a predetermined timing.

2. The pallet exchanging device as claimed in claim 1, further comprising catch means for holding a pallet at the stand-by position.

3. The pallet exchanging device as claimed in claim 1, wherein said table has a base and said power dividing and transmitting device comprises:
    a power dividing shaft rotatably mounted in the base; and
    a cylindrical cam mounted to a first end of said power dividing shaft; and
    said clamp/unclamped means comprises:
    a seesaw arm pivotably to the base, said seesaw arm having a cam follower at a first end engaging said cylindrical cam.

4. The pallet exchanging device as claimed in claim 1, wherein said load/unload means includes a groove in an underside of a pallet; and
    said power dividing and transmitting means includes a swing arm that moves between a working position and a loading position, said swing arm having a cam follower at a free end for engaging the groove in the underside of the pallet.

5. A pallet exchanging device, for a machine tool having a table mounted on a bed of the machine tool, comprising:
    at least one pallet;
    a pallet rack attached to the bed of the pallet rack capable of holding a pallet;
    means for moving said pallet from said pallet rack to a work position on the table and for moving said pallet from the work position to said pallet rack;
    means for clamping said pallet to the table;
    drive means for driving said means for moving and said means for clamping; and
    power dividing means for dividing and transmitting power to said means for moving and said means for clamping.

6. A pallet exchanging device as claimed in claim 5, wherein said pallet rack is capable of holding at least two pallets.

7. A pallet exchanging device as claimed in claim 6, wherein said pallet rack has at least one pallet thereon and has an open position for receiving a pallet unloaded from the machine tool.

8. A pallet exchanging device as claimed in claim 7, wherein said pallet rack is moveable along said bed at least so as to position said pallet at a loading position.

9. The pallet exchange device as claimed in claim 5, wherein said means for moving comprises:
    a groove in the underside of said pallet; and a swing arm moved by said power dividing means between a working position and a loading position, said swing arm having a cam follower for engaging said groove in the underside of said pallet.

10. The pallet exchange device as claimed in claim 5, wherein said means for clamping comprises:
   a base of the pallet exchanging device having at least two positioning members thereon;
   at lest two positioned members on an underside of said pallet corresponding to said positioning members;
   a groove extension on a undersurface of said pallet;
   a clamp member mounted in said base so as to engage said groove extension; and
   a seesaw arm having one end slidably engaged with said clamp member.

11. The pallet exchange device as claimed in claim 10, said clamp member comprising:
   a plate portion;
   a well portion extending from said plate portion, a hole passing through said plate portion to said well;
   a clamp pin seated in said well portion with an end extending through said hole, said end engaging said groove extension;
   a spring mounted in said well portion around said clamp pin to cause engagement with said groove extension; and
   an engaging portion slidably receiving said one end of said seesaw arm.

12. The pallet exchanging device as claimed in claim 5, wherein said power dividing means comprises:
   a power dividing shaft rotatably mounted in said base;
   a cylindrical cam mounted to a first end of said power dividing shaft; and
   a cam follower mounted to a second end of said power dividing shaft.

13. The pallet exchanging device as claimed in claim 12, wherein said means for moving comprises a swing arm that engages said pallet at a first end, a second end of said swing arm having a follower guide that is engaged by said follower cam to move said swing arm between a first position and a second position.

14. The pallet exchange device as claimed in claim 12, wherein said means for clamping comprises:
   a seesaw arm pivotably mounted to said base; and
   a cam follower at one end of said seesaw arm engaged with said cylindrical cam.

15. The pallet exchange device as claimed in claim 5, where said pallet rack and said table have rails for supporting said at least one pallet and permitting sliding movement.

* * * * *